(12) United States Patent  (10) Patent No.: US 7,975,712 B2
 Beacco  (45) Date of Patent: Jul. 12, 2011

(54) HUNTING BLIND

(76) Inventor: Michael A. Beacco, St. George, UT (US)

( * ) Notice: Subject to any disclaimer, the term of this patent is extended or adjusted under 35 U.S.C. 154(b) by 98 days.

(21) Appl. No.: 12/345,476

(22) Filed: Dec. 29, 2008

(65) Prior Publication Data

US 2009/0165352 A1    Jul. 2, 2009

Related U.S. Application Data

(60) Provisional application No. 61/017,514, filed on Dec. 28, 2007.

(51) Int. Cl.
 *E04H 15/46* (2006.01)
(52) U.S. Cl. .................. 135/139; 135/97; 135/901; 43/1
(58) Field of Classification Search .................. 135/139,
  135/140, 141–144, 901; 43/1–3
 See application file for complete search history.

(56) References Cited

U.S. PATENT DOCUMENTS

| | | | | |
|---|---|---|---|---|
| 1,666,961 A | * | 4/1928 | Delvin | 135/144 |
| 2,827,065 A | * | 3/1958 | Chapron | 135/121 |
| 2,885,233 A | * | 5/1959 | Horowitz | 403/170 |
| 2,980,124 A | * | 4/1961 | Atchison | 135/154 |
| 3,323,530 A | * | 6/1967 | Smith | 135/157 |
| 3,483,999 A | * | 12/1969 | Barrett | 211/204 |
| 4,077,418 A | * | 3/1978 | Cohen | 135/95 |
| 4,091,766 A | * | 5/1978 | Colliard | 359/518 |
| 4,256,300 A | * | 3/1981 | Boucher | 472/118 |
| 4,846,205 A | * | 7/1989 | Knoll | 135/154 |
| 4,974,621 A | * | 12/1990 | Lerma | 135/139 |
| 5,255,698 A | * | 10/1993 | Riley | 135/142 |
| 6,068,009 A | * | 5/2000 | Paes et al. | 135/117 |
| 7,290,553 B2 | * | 11/2007 | Prevost | 135/143 |

* cited by examiner

*Primary Examiner* — Noah Chandler Hawk
(74) *Attorney, Agent, or Firm* — Morriss O'Bryant Compagni, P.C.

(57) ABSTRACT

A hunting blind is comprised of a frame and a fabric shell supported by and releasably attached to the frame. The frame is comprised of a pair of A-frame structures of similar configuration and each includes telescopic members forming legs and a cross-member that spans between the legs. Coupling assemblies pivotally attach the legs to the cross-member so that the legs can be selectively folded against or extended from the cross-member.

20 Claims, 15 Drawing Sheets

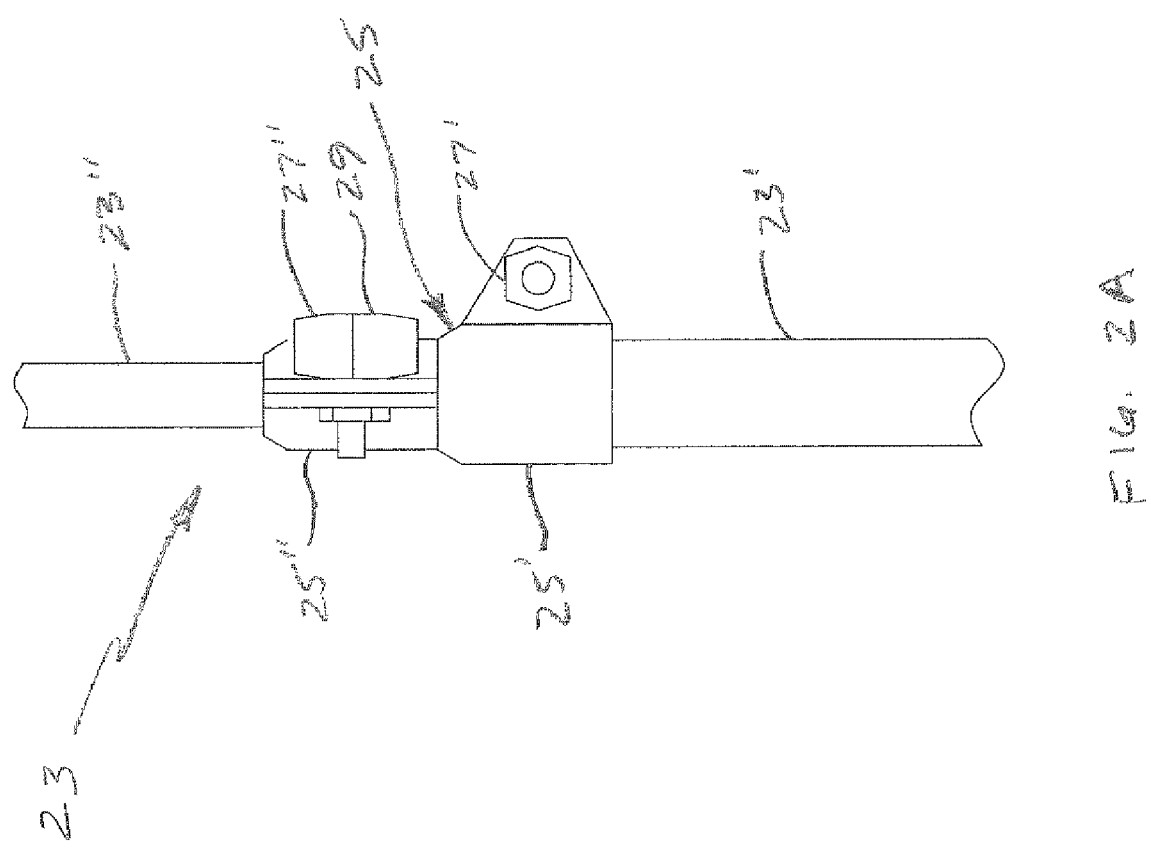

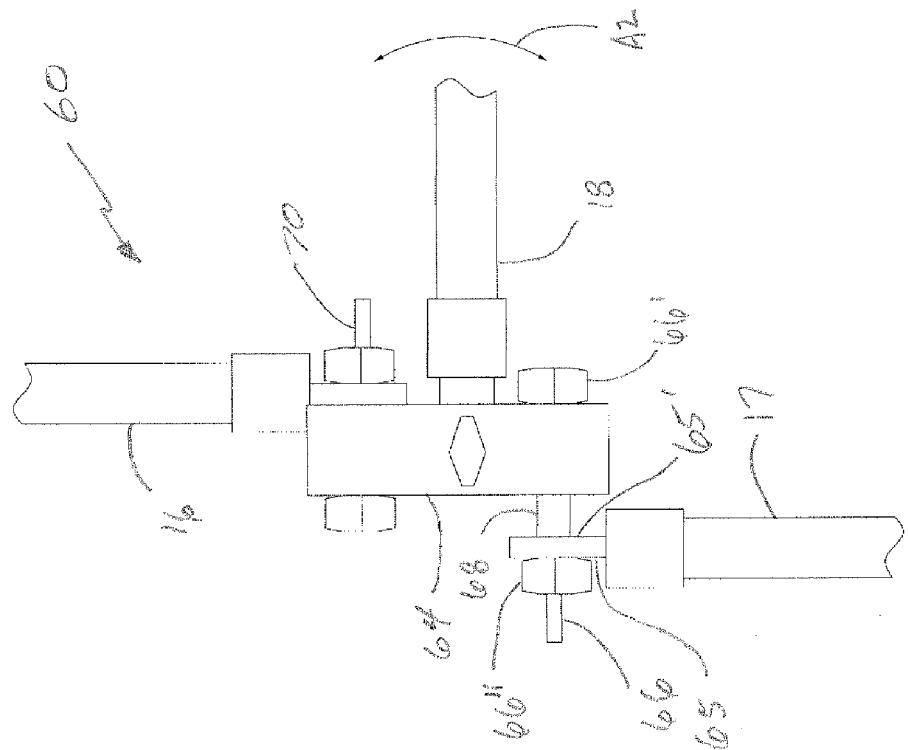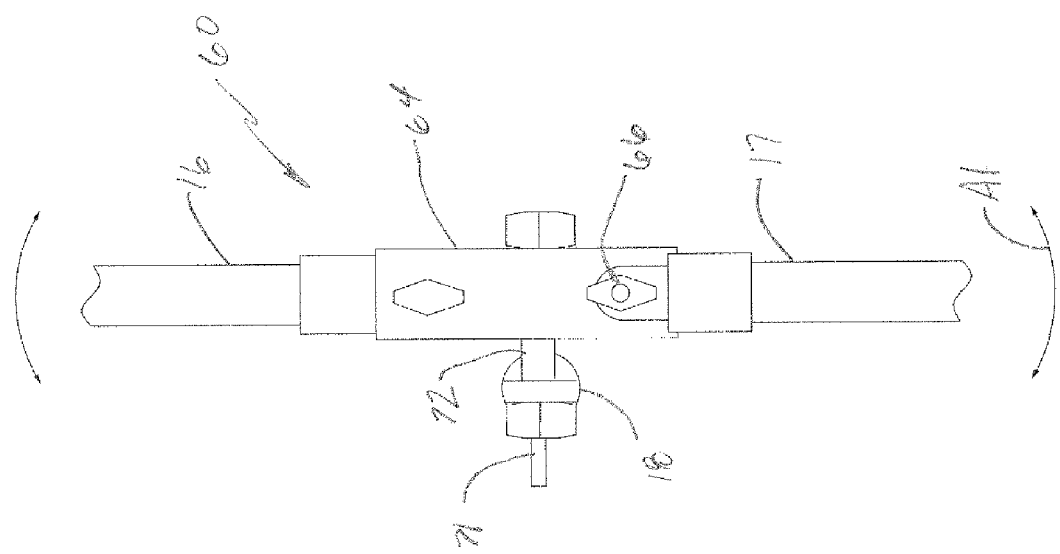

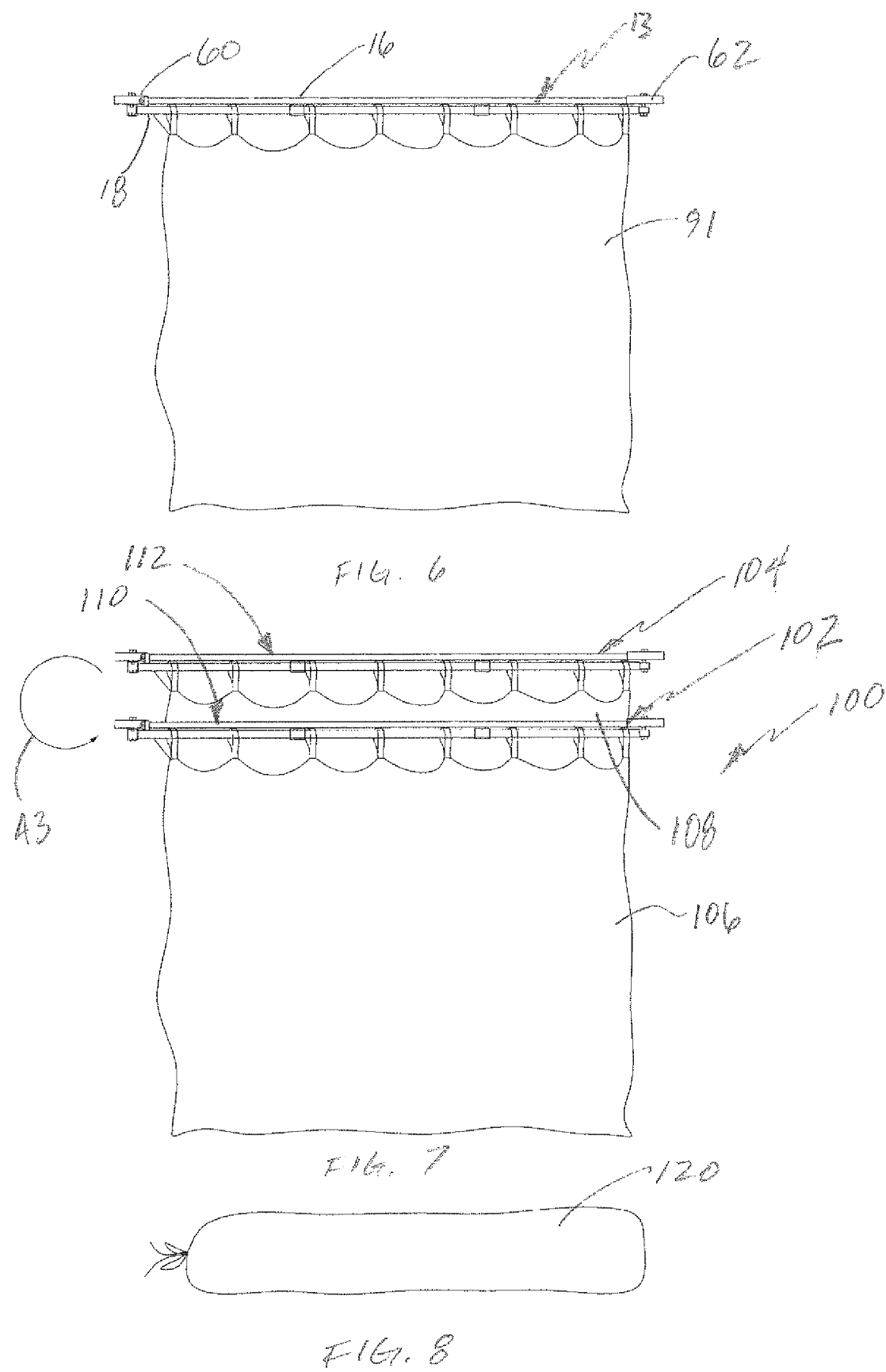

HUNTING BLIND

CROSS-REFERENCE TO RELATED APPLICATIONS

This application claims priority to U.S. Provisional Patent Application Ser. No. 61/017,514, filed on Dec. 28, 2007, the entirety of which is incorporated by this reference.

FIELD OF THE INVENTION

The present invention relates generally to hunting blinds and more specifically to a hunting blind comprising a telescopic tubular framework that, when erected, supports a camouflage fabric skin behind which a person or persons may be concealed from the view of various wildlife.

BACKGROUND

There are various hunting blinds that implement the use of camouflage fabric for concealment of hunters. Such blinds, however, lack adequate adjustability for use in various hunting applications and are designed to function in one particular hunting application. For example, some existing blinds are adequate for the user to view and hunt ground game only. Viewing and hunting birds in the air are not options. Conversely, blinds configured for viewing and hunting birds in the air do not function to allow the user to view and hunt animals on the ground.

Accordingly, it would be an advantage to provide a hunting blind that is easily adjustable in the field to allow a user to adjust the size of the blind as well as allow the user to configure the blind to accommodate various hunting situations.

SUMMARY OF THE INVENTION

A hunting blind according to the principles of the present invention is configured to be versatile, adjustable and portable. The configuration of the blind allows for viewing and hunting animals in the air as well as on the ground, even at the same time, without making any major adjustments or alterations. The blind's length and height can be easily adjusted to accommodate various situations in the field. For example, the blind can be easily adjusted to provide concealment for a single person or approximately six.

Moreover, the hunting blind of the present invention can be broken down and transported or stored in a relatively small package while being capable of extending to three times its length. The light weight design of the blind allows it to be transported easily in the field if desired.

In one embodiment, the blind consists of two identical halves which can be used separately as two blinds, or used together to form a single blind. The adjustability of the blind allows it to be set up on various terrains, including uneven surfaces. It is configured to be easily attached temporarily to a boat or other desired object.

The camouflage skin of the blind also has a novel configuration, making the blind even more versatile. The skin is comprised of fabric panels, which may have a camouflage print, joined together by snaps, hook and loop tape (sold under the trademark VELCRO®) or other means that allow for temporary attachment of adjacent panels. Each fabric panel is also attached to the framework of the blind in a temporary manner. This allows the panels to be easily removed and attached to the framework. The panels may be offered in various camouflage prints that can be easily interchanged with the existing panels. The locations where adjacent panels are joined provide entrances and exits for the user, as well as serving as adjustable windows through which the user may look. Additional windows may be located on each fabric panel, allowing the user many options for viewing.

DESCRIPTION OF THE DRAWINGS

The foregoing summary, as well as the following detailed description of the preferred embodiments is better understood when read in conjunction with the appended drawings. For the purpose of illustrating the invention, there is shown in the drawings embodiments that illustrate what is currently considered to be the best mode for carrying out the invention, it being understood, however, that the invention is not limited to the specific methods and instruments disclosed. In the drawings:

FIG. 2A is a front view of a telescopic coupling device in accordance with the principles of the present invention.

FIGS. 4A and 4B are side and top views, respectively, of a first embodiment of a leg and cross-member coupling assembly in accordance with the principles of the present invention.

FIG. 6 is a front side view of a folded frame and associated fabric panel coupled thereto in accordance with the principles of the present invention.

FIG. 7 is a front side view of a pair of folded frames and associated fabric panels coupled thereto in accordance with the principles of the present invention.

FIG. 8 is a side view of a storage bag for receiving a hunting blind in collapsed form in accordance with the principles of the present invention.

DETAILED DESCRIPTION OF THE INVENTION

Figure 1:
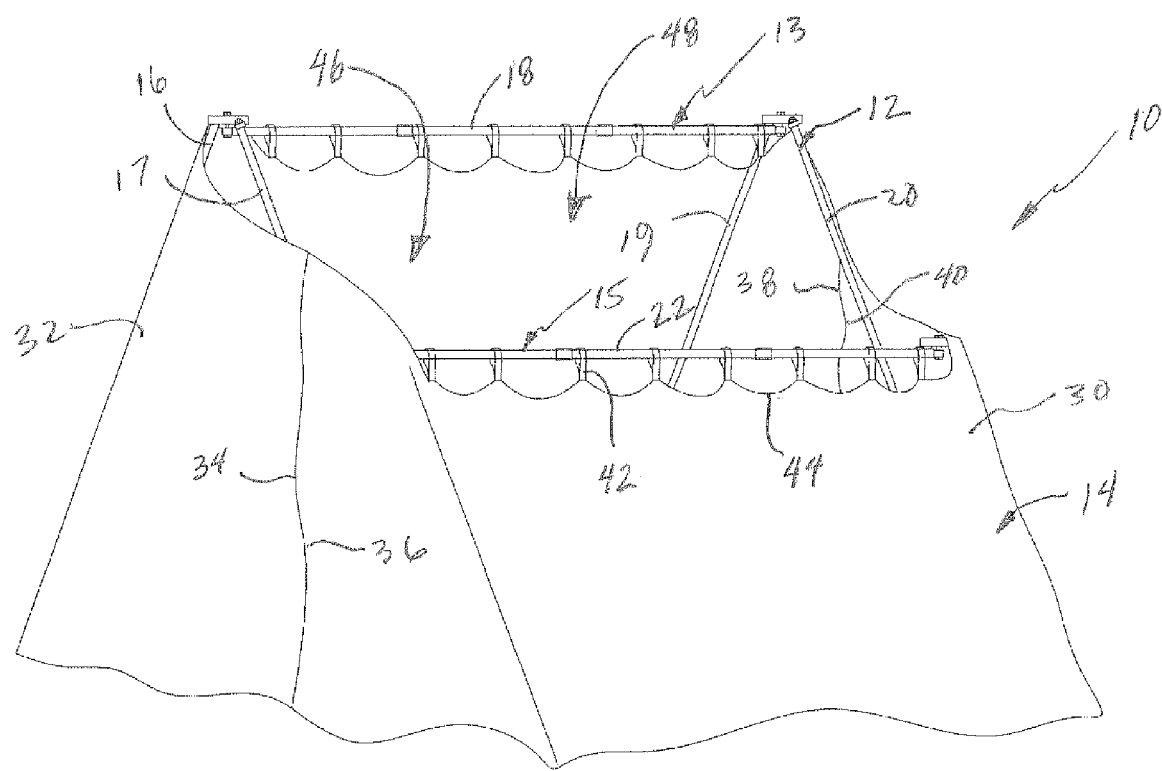
FIG. 1 is a perspective front view of a first embodiment of a hunting blind in accordance with the principles of the present invention.

As shown in FIG. 1, a hunting blind 10 is comprised of a frame 12 and a fabric shell or skin 14 supported by and releasably attached to the frame 12. As will be described in more detail herein, the hunting blind 10 is configured for being easily erected by hand and easily collapsible in such a manner that the entire hunting blind 10 can be rolled up inside the fabric skin 14 and stored or transported in a stuff sack or a back pack. When the hunting blind 10 is to be used after storage, the collapsed blind 10 is removed from the stuff sack or back pack, the fabric skin 14 is unrolled, the frame 12 removed from the fabric skin 14 and the blind is erected in a desired location.

The frame 12 is comprised of a pair of A-frame structures 13 and 15 of similar configuration. The frame structures 13 and 15 may be made from a lightweight material, such as aluminum or graphite. A-frame structure 13 includes telescopic tubular members 16, 17, 18, 19 and 20, with members 16, 17, 19 and 20 forming legs and member 18 forming a cross-member that spans between the legs 16, 17, 19 and 20. Each A-frame may be comprised of round tubing in aluminum or other light-weight material and in a color or finish having minimal reflective qualities, so as to not be easily detectable by game. The A-frame is telescopic so that the height and width of the A-frame can be adjusted. The number of telescopic sections and the length of each section may be modified from that which is specifically described herein.

To assemble the blind 10, the structures 13 and 15 are unfolded adjusted for height and length and set up to stand alone. If the fabric skin 14 is not already attached to the framework 12, it can be attached. If the skin 14 is attached to the frame 12, the skin 14 can remain attached to the framework 12 during set up and break down.

The skin 14 is comprised of a plurality of fabric panels 30 and 32 that are temporarily and removably attached to each other along adjacent edges 34 and 36 and 38 and 40, such as with snaps or hook and loop tape, and temporarily and removably attached to the cross-members 18 and 22 of the frame structures 13 and 15, respectively. To attach the panels 30 and 32 to their respective cross-members 22 and 18, each panel 30 and 32 are provided with a plurality of straps, such as strap 42 attached to the top edge 44 of the panel 30. The straps 42 are looped over the cross-member 22 so that the panel 30 effectively hangs from the cross-member 22. Once erected, an open space 46 is created between panels 30 and 32 for housing one or more hunters with an opening formed between the cross-members 18 and 22 for sky viewing of fowl and to allow a hunter to stand within the blind 10 in order to shoot over the cross members 18 and 22. The panels 30 and 32 allow a hunter to be positioned within the blind 10 in such a manner that the hunter is not readily visible to game. When shooting from the blind 10, the hunter can shoot over either of the cross-members 18 or 22, through an opening between adjacent panels 30 and 32 or between the cross-member and its respective panel by unfastening one or more straps 42 from the cross-member. This allows the blind 10 to be used for game that may be in the air or on the ground without having to modify the blind 10, other than opening or disengaging one or more of the temporary attachment features of the blind 10.

Figure 2:
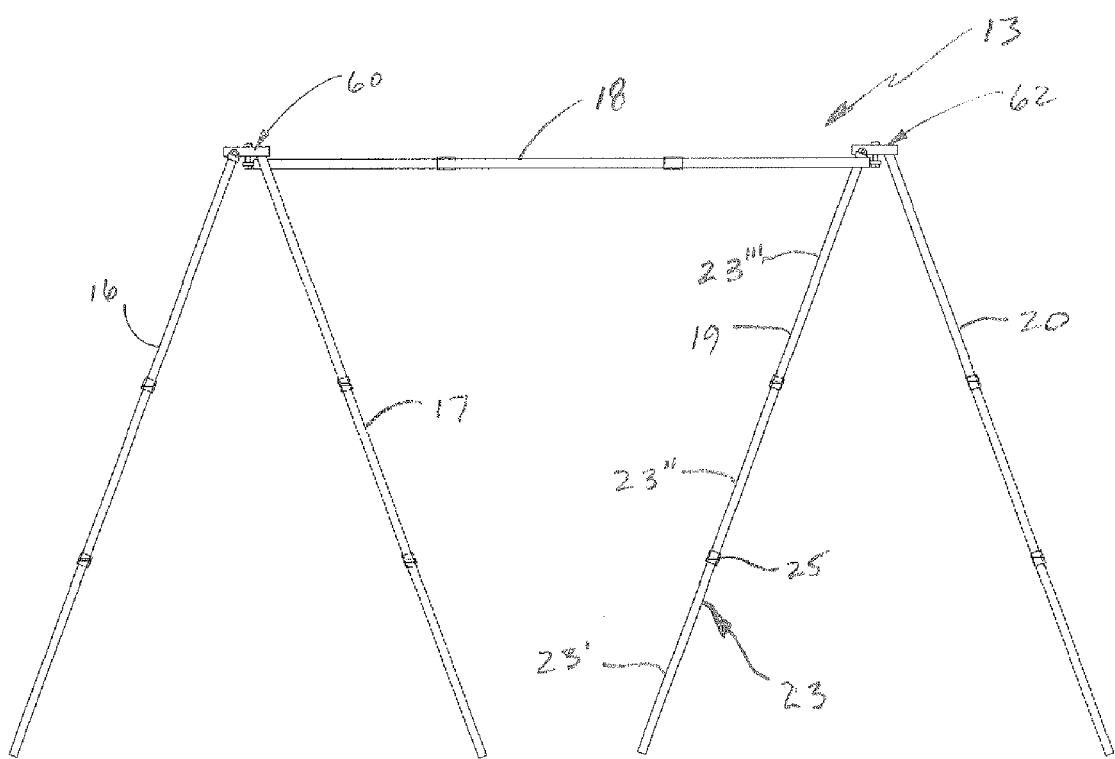
FIG. 2 is a perspective front view of a first frame structure for the hunting blind illustrated in FIG. 1.

As shown in FIG. 2, the frame for a blind, such as blind 10, is comprised of A-frame structure 13, which, when erected as shown, includes two pairs of legs 16, 17 and 19, 20. The cross-member 18 is coupled to and between the pairs of legs 16, 17 and 19, 20. Each cross-member 18 or leg 16, 17, 19 and 20 are formed from a plurality of tubular members in a telescopic construction to form a telescopic member 23. That is, each telescopic member 23 is formed from a plurality of hollow tubular sections 23', 23" and 23'" coupled together using telescopic couplers 25. Each of the sections 23', 23" and 23'" have different diameters such that, for example, the section 23'" can fit within in a sliding manner the section 23" and the section 23" can fit within in a sliding manner 23'. The A-frame 13 can be used with a single fabric panel, such as panel 32, in situations where camouflage cover from behind the hunter is not necessary or desired. Thus, a blind may consist of half of the blind 10 illustrated in FIG. 1.

As further illustrated in FIG. 2A, the coupler 25 includes a pair of integrally formed slotted sleeves 25' and 25". The sleeve 25' is sized and configured for receiving the section 23' and the sleeve 25" is sized and configured for receiving the section 23". Each sleeve 25' and 25" can be tightened around its respective section 23' and 23" to with threaded fasteners 27' and 27". The sleeve 25' receives and fixedly holds an end of the section 23' therein. Because the sleeve 25' is configured to be fixedly attached to the section 23', the fastener 27' may be configured to be removable with a wrench or other device. The sleeve 25" is configured to be selectively tightened around the section 23" such that the length of the telescopic member 23 can be readily adjusted by a user. Thus, the fastener includes a gripping member 29 that allows the user to rotate the fastener by hand to tighten the sleeve 25" around the section 23" when at the desired length or to release the section 23" when adjustment of the section 23" relative to the sleeve 25" is desired.

Referring again to FIG. 2, by providing length adjustability for each member 16-20, the height, angle (relative to the ground) and length of the cross-member 18 can be adjusted as desired by a user to set up the blind 10 in any desired configuration to fit a particular hunting application or terrain on which the blind is erected.

Figure 3:
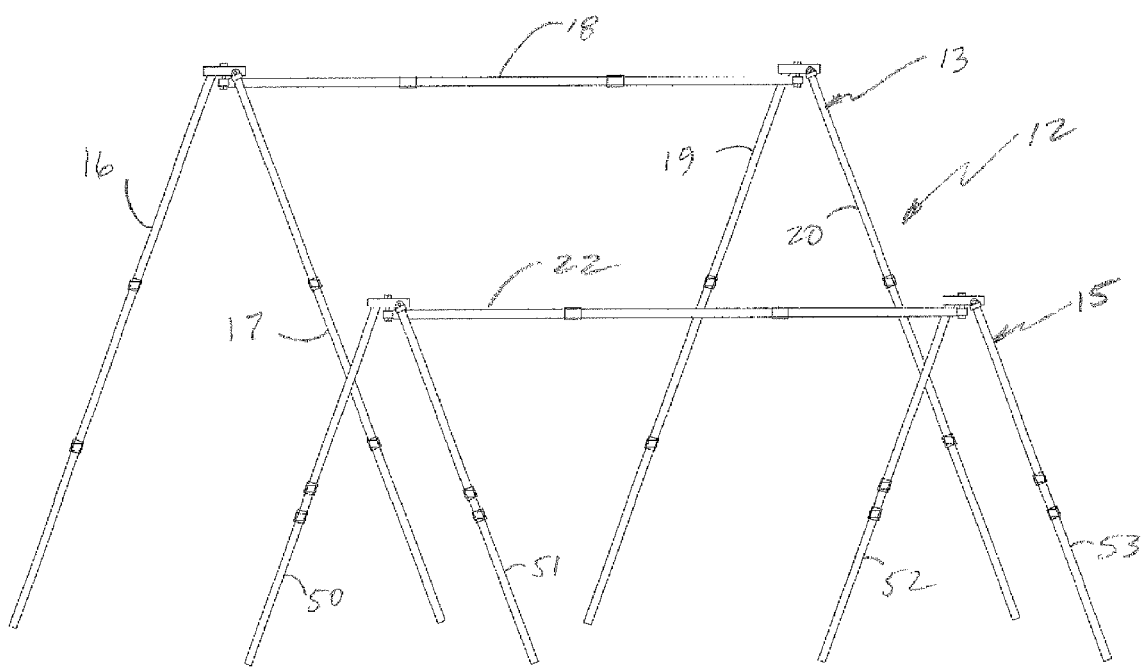
FIG. 3 is a perspective front view of first and second frame structures for the hunting blind illustrated in FIG. 1.

As shown in FIG. 3, the frame 12 is comprised of two substantially identical A-frames 13 and 15. Each A-frame 13 and 15 are independently erected and are independently adjustable of one another. When the A-frames 13 and 15 are positioned proximate one another as shown, the fabric shell or skin 14 can be fastened around the A-frames to form the hunting blind 10 shown in FIG. 1. Note that the A-frames 13 and 15 are configured in FIG. 3 to have different overall heights such that the cross-members 18 and 22 are supported by their respective legs at a different height from a support surface, such as the ground. This allows a hunter positioned within the blind 10 of FIG. 1 to peer over the front cross-member 22 while being concealed from behind by the blind 10. Also, because of the independent adjustability of length of each leg 16, 17, 19, 20, 50, 51, 52 and 53, the elevation of the cross-members 18 and 22 can be positioned horizontally, even when the blind is positioned on uneven terrain. By maintaining the cross-member in a substantially horizontal position, the fabric skin can be more easily evenly distributed over the length of each cross-member.

Accordingly, the framework 12 of the blind 10 comprises two substantially identical A-frame structures 13 and 15. As shown in FIG. 2, the A-frame 13 is comprised of four legs 16, 17, 19 and 20, a horizontal cross-member 18 and two bracket or coupling assemblies 60 and 62. The coupling assemblies 60 and 62 join the legs 16, 17, 19 and 20 to the horizontal cross-member 18.

As shown in FIGS. 4A and 4B, the coupling assemblies, such as assembly 60, are comprised of an elongate mounting member 64, which may be comprised of a length of hollow square tubing. The legs 16 and 17 and cross-member 18 are each pivotally attached to the mounting member 64. The leg 17 is provided with a mounting structure 65 attached to its proximal end that is comprised of a flat plate 65' through which a transversely extending bore is defined. The flat plate 65' is coupled to the mounting member 64 with an elongate externally threaded fastener 66 that passes through a transversely extending bore (not visible) in the mounting bracket 64 and through the flat plate 65'. The fastener 66 includes a head 66' and nut 66" that can be finger tightened or loosened by a user by providing a finned or wing-nut configuration to be grasped by a user. A hollow, cylindrical spacer 68 is positioned between the mounting member 64 and the plate 65' to space the leg 17 away from the mounting member 64 to allow the leg 17 to rotate as shown by arrow A1 around the fastener 66 a full 360 degrees without contacting the mounting member 64 or the fastener 70 configured to rotatably attach the leg 16 to the mounting member 64 in a similar manner. The leg 17 is mounted to the opposite side of the mounting member 64 so that the legs 16 and 17 are substantially maintained in a vertically parallel relationship relative to the longitudinal axis of the mounting member 64. The cross-member 18 is attached with fastener 71 to the mounting member 64 in a manner similar to the attachment of the leg 17 and with spacer 72 spacing the proximal end of the cross-member 18 away from the mounting member 64 to allow the cross-member 18 to rotate 360 degrees as shown by arrow A2. The legs are attached to the bracket in such a way that allows the legs to rotate on their horizontal axis. Thus, each leg 16 and 17 and cross-member 18 can rotate about an axis perpendicular to the longitudinal axis of each and about their proximal ends relative to the mounting member 64. When the fasteners 70 and 66 are loosened, the legs 16 and 17 can be spread apart at their respective distal ends (as shown in FIG. 3) in order to form the A-frame structure previously described and then tightened to the mounting member 64 to hold their relative positions. Once both sets of legs are fastened to their respective mounting member, the cross-member 18 can be held to the mounting member 64 by tightening the fastener 71. When erected in this manner, the A-frame structure is self-supporting and can stand alone, similar to how the main beam of a roof rests on its outermost trusses. The movement of the legs 16 and 17 is controlled by the user by either tightening or loosening the fasteners 70 and 66 to attach or loosen the legs 16 and 17 relative to the mounting member 64, which can be performed easily in the field, requiring no special tools.

Figure 5:
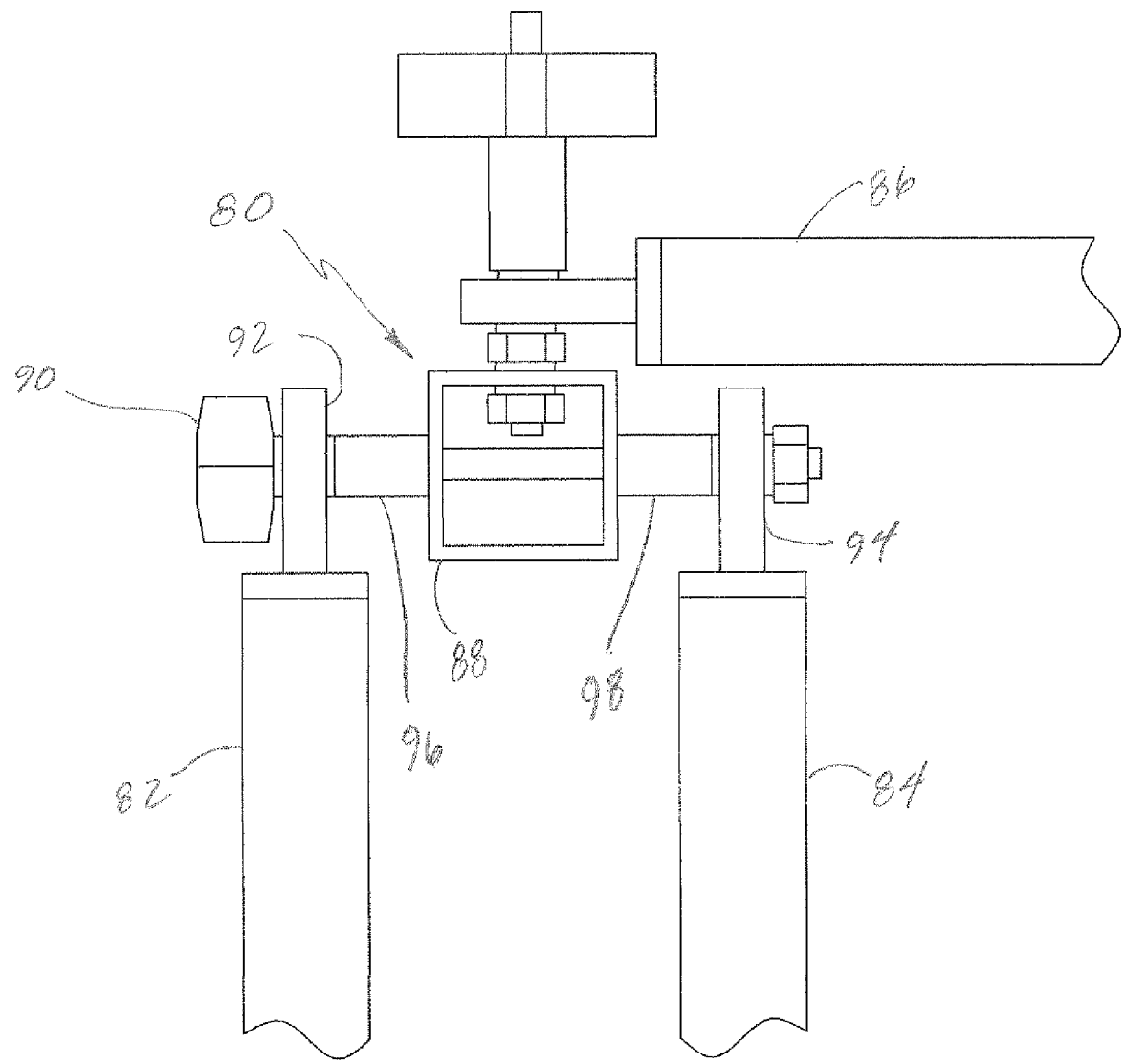
FIG. 5 is a side view of a second embodiment of a leg and cross-member coupling assembly in accordance with the principles of the present invention.

FIG. 5 shows an alternate embodiment of a coupling assembly 80 for coupling legs 82 and 84 to each other and a cross-member 86. A mounting member 88 is comprised of a section of square hollow tubing to which the legs 82 and 84 and cross-member 86 are pivotally attached. An elongate fastener 90 passes through mounting portions 92 and 94 provided on the proximal ends of each leg 82 and 84 and through the mounting member 88 such that the legs 82 and 84 are each positioned opposite sides of the mounting member 88. Spacers 96 and 98 space the respective legs away from the mounting structure 88 to allow rotation of the legs 82 and 84 without obstruction by the mounting member 88. The cross-member 86 is rotatably attached to the top of the mounting member 88 so that the cross-member 86 is substantially perpendicular to the legs 82 and 84. When collapsing the legs and cross-member, the legs 82 and 84 are positioned parallel to one another as shown, and the cross-member 86 is rotated about ninety degrees and then the mounting member 88 is rotated about ninety degrees such that the cross-member 86 and legs 82 and 84 are substantially parallel.

As shown in FIGS. 6, 7 and 8, the configuration of the coupling assemblies 60 and 62 along with the legs, such as leg 16, and cross-member 18 mounted thereto allows the leg and cross-member 18 to lie substantially parallel to each other in an adjacent position for transport and storage. That is, the leg 16 can be rotated when loosened from the coupling assembly 60 to be positioned substantially parallel and proximate to the cross-member 18. Likewise, when loosened from the mounting structure 64, the cross-member can be rotated to be substantially parallel and proximate to the leg 16 so that the leg 16 and cross-member 18 are all positioned relative to one another. In an erect configuration, when the legs are positioned as shown in FIG. 2, the legs are rotated to be in parallel with the mounting member and then mounting member along with the legs are rotated about ninety degrees to be in approximate alignment with the cross-member 18. When a fabric panel 91 is attached to the cross-member 18, the legs and cross-member can be rolled within the fabric panel 100. As shown in FIG. 7, when the section 102 is laid on top of the section 104 of a blind 100 with the fabric panels 106 and 108 attached to their respective frame sections 110 and 112 attached to the fabric panels, the frame sections 110 and 112 can be rolled, as shown by arrow A3, within the fabric panels 106 and 108 and then placed within a stuff sack 120 as shown in FIG. 8 for easy transport and storage.

Figure 9:
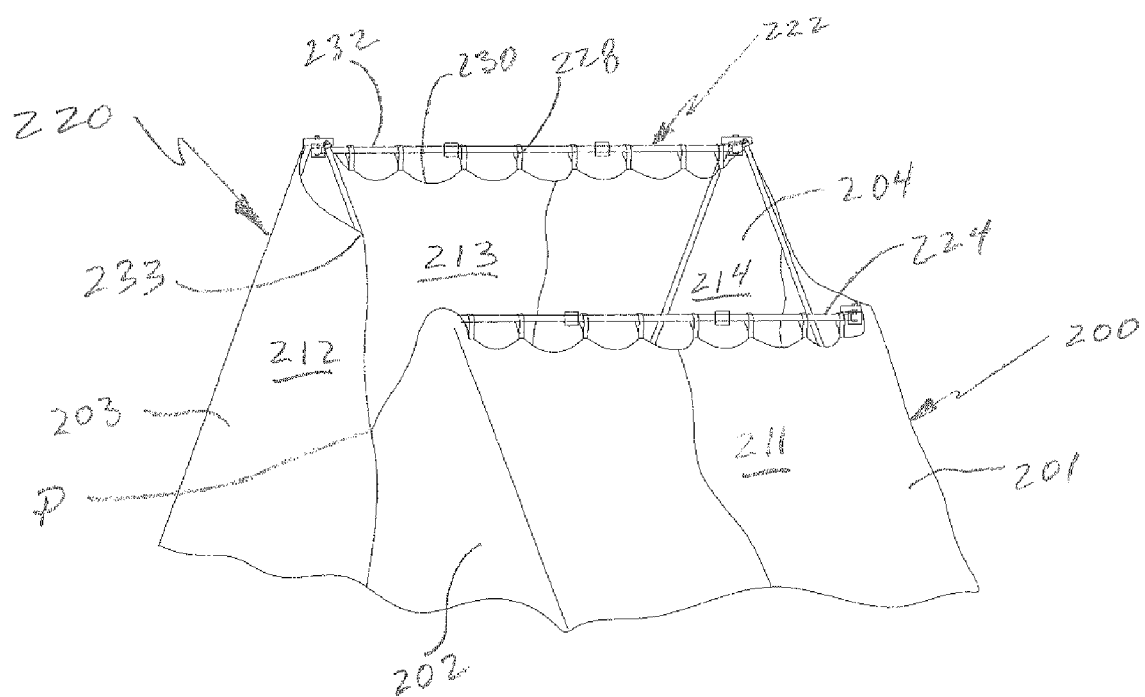
FIG. 9 is a perspective front view of a second embodiment of a hunting blind in accordance with the principles of the present invention.

As shown in FIG. 9, a fabric shell or skin 200 of the present invention is comprised of a plurality of separate panels 201-204 of camouflage fabric that, when temporarily joined together, form four side walls 211-214 of the bind 220. The panels 201-204 wrap around the frames 222 and 224 and are temporarily and removably attached thereto by a plurality of fabric straps, such as strap 228 that is permanently attached at one end to an upper edge 230 of the fabric panel 203. The straps may be positioned in approximately eighteen inch increments.

Each strap 228 is looped around a cross-member 232 and then temporarily attached at one end to the panel by snaps or other temporary means, such as hook and loop fastener. The loops are long enough to allow the fabric panel to slide freely along the horizontal cross-member, which allows the length of the cross-member to be adjusted as desired and also allows all of the fabric panels to remain attached to the framework while the framework is in its shortest dimension, as may be the case when collapsed for storage. Thus, the fabric panels act as a curtain hanging from a curtain rod that can be bunched together when the length of the cross-member 232 is shortened and expanded by sliding the loops along the cross-member 232 when the length of the cross-member is increased by adjustment by the user.

Because the fabric panels 201-204 of the skin 200 are joined together and to the framework by temporary means such as snaps or hook and loop fastener material, panels can be removed or added to accommodate various configurations and sizes of the frame. If weight is a consideration for transportation, as when backpacking, only those panels absolutely necessary for adequate concealment can be attached to the framework, while leaving behind those panels not necessary.

Figure 10:
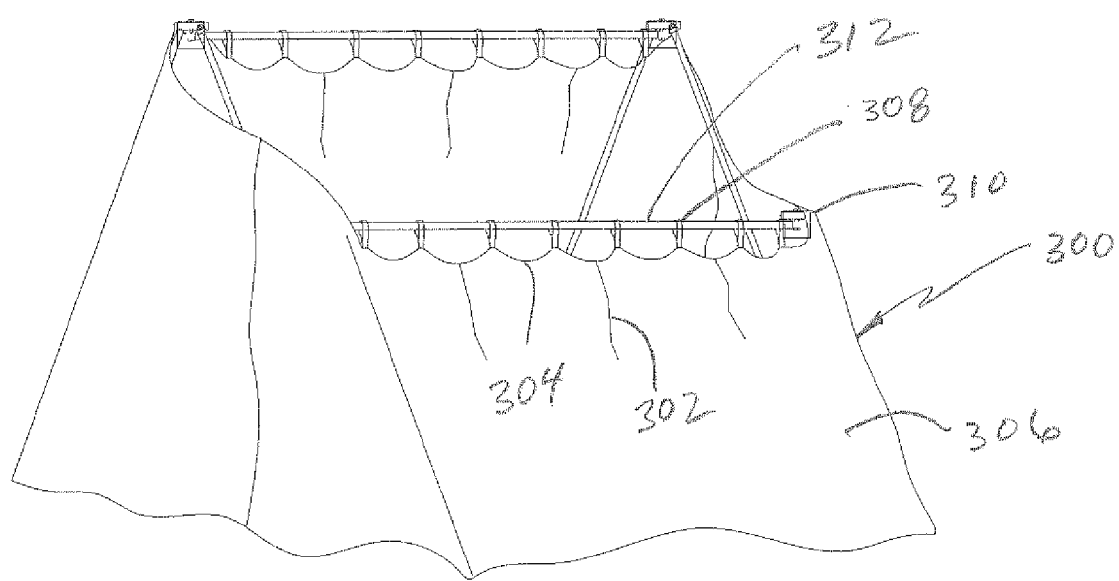
FIG. 10 is a perspective front view of a third embodiment of a hunting blind in accordance with the principles of the present invention.
Figure 11:
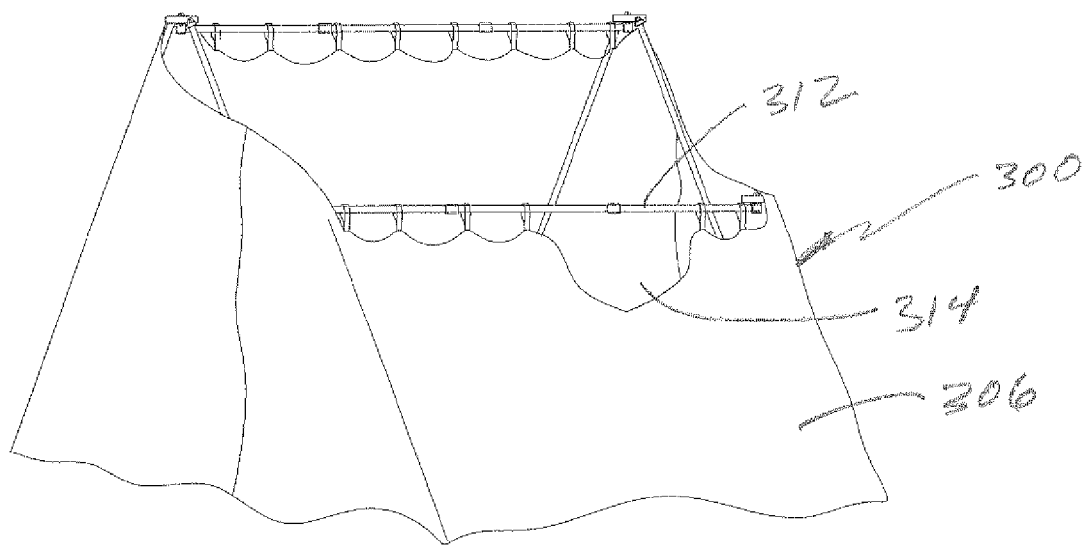
FIG. 11 is a perspective front view of a fourth embodiment of a hunting blind in accordance with the principles of the present invention.

As shown in FIG. 10, a fabric shell 300 includes a plurality of vertical cuts or slits, such as cut 302, which are perpendicular to the top edge 304 and start along the top edge 304 of the panel 306 and continuing downward a distance, such as approximately sixteen inches. The slits 302 are held together by temporary means, such as snaps or hook and loop fastener, so that when needed, the user may open the slit, detach one or more loops 308 or a corner 310 of the fabric from the cross-member 312, allowing the panel of fabric 306 to fall downward, providing a window 314 through which the user can see, aim and shoot, as shown in FIG. 11.

In another embodiment, as shown in FIG. 9, the user may detach one corner 233 of a panel 203 where two panels 202 and 203 join, separating the panels 202 and 203 to a desired point P. By using the same method at all locations where the panels are joined temporarily, the user can achieve the same results. Because there is no roof or top portion of the fabric skin (although a temporary one could be added), a user can readily observe or hunt birds in the air, as well as game on the ground.

With the assembled frame 13 lying on the ground as shown in FIG. 6 and with the leg and cross-member fasteners previously described, the legs are rotated to a position that is perpendicular to the cross-member 16. By loosening the sleeves attached to and between the leg sections, the length of each telescopic leg can be adjusted. Once a desired leg length is achieved, the sleeves can then be secured to the leg sections to hold the sections of each leg in place to retain the desired leg length. By grasping the horizontal beam, the user can lift the cross-member 16 off of the ground while the ends of the legs are in contact with the ground. With the frame in an upright position, the user rotates the leg brackets as needed to a position substantially perpendicular to the cross-member with the legs being perpendicular to the cross-member. The user then tightens the fasteners that attach the cross-member to the bracket, preventing any further rotation of the bracket relative to cross-member. The legs on each end of the cross-member are manipulated in such a manner that the leg ends opposite where they are attached to the bracket are each rotated about the bracket so that the distal ends of each pair of legs are moved apart from each other to form an A-frame with the two legs.

Once the leg ends are separated as previously described, the fasteners that attach each leg to the bracket is tightened so that the legs are held in place relative to the bracket and the cross-member. The frame 13 is now in a self-supporting configuration.

By loosening the sleeves attached to and between the cross-member sections, the length of the telescopic cross-member can be adjusted by lifting one side of the frame 13 off the ground and pulling the lifted side of the frame 13 away from the opposite end to extend the length of the cross-member. Once a desired cross-member length is achieved, the sleeves can then be secured to the cross-member section to hold the sections of the cross-member in place to retain the desired cross-member length.

If not already attached to the frame, the user may now add the desired number of camouflage fabric panels to the frame by looping the straps on the top edge of the fabric around the cross-member and attaching it to itself. Once the fabric is attached, this portion of the blind can be used, or if additional concealment is desired, the second section of the blind can be assembled in a similar manner. When the second section is assembled, the two sections are placed in proximate and substantially parallel relationship and so that sides of the fabric at the unattached sides of the fabric can be coupled together. Depending on the size of the fabric panels, the distance between cross-members may be from about two to four feet, with a desired distance of about three feet. The sides of the fabric are joined together by hook and loop, snaps or other temporary fasteners known in the art. A user may enter and exit the blind by selectively opening the fabric at any point where two panels are temporarily joined together.

Figure 12:
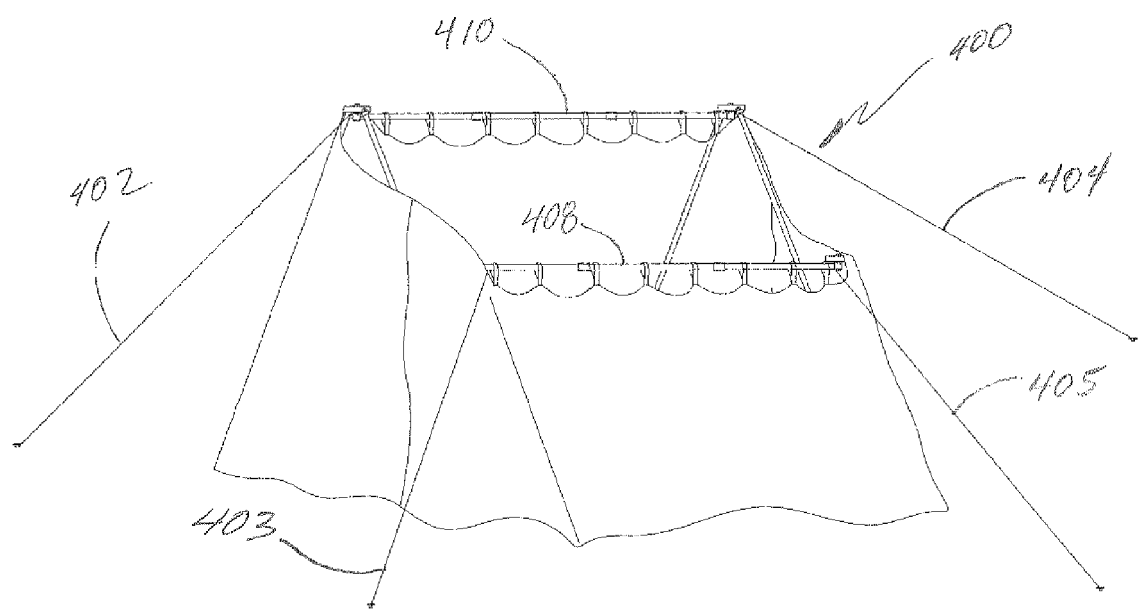
FIG. 12 is a perspective front view of a fifth embodiment of a hunting blind in accordance with the principles of the present invention.

As shown in FIG. 12, if additional stability is required, particularly when a blind 400 is being used in windy conditions, lengths of cord 402, 403, 404 and 405 can be attached to the ends of each horizontal tube 408 and 410 and staked into the ground as shown.

Figure 13:
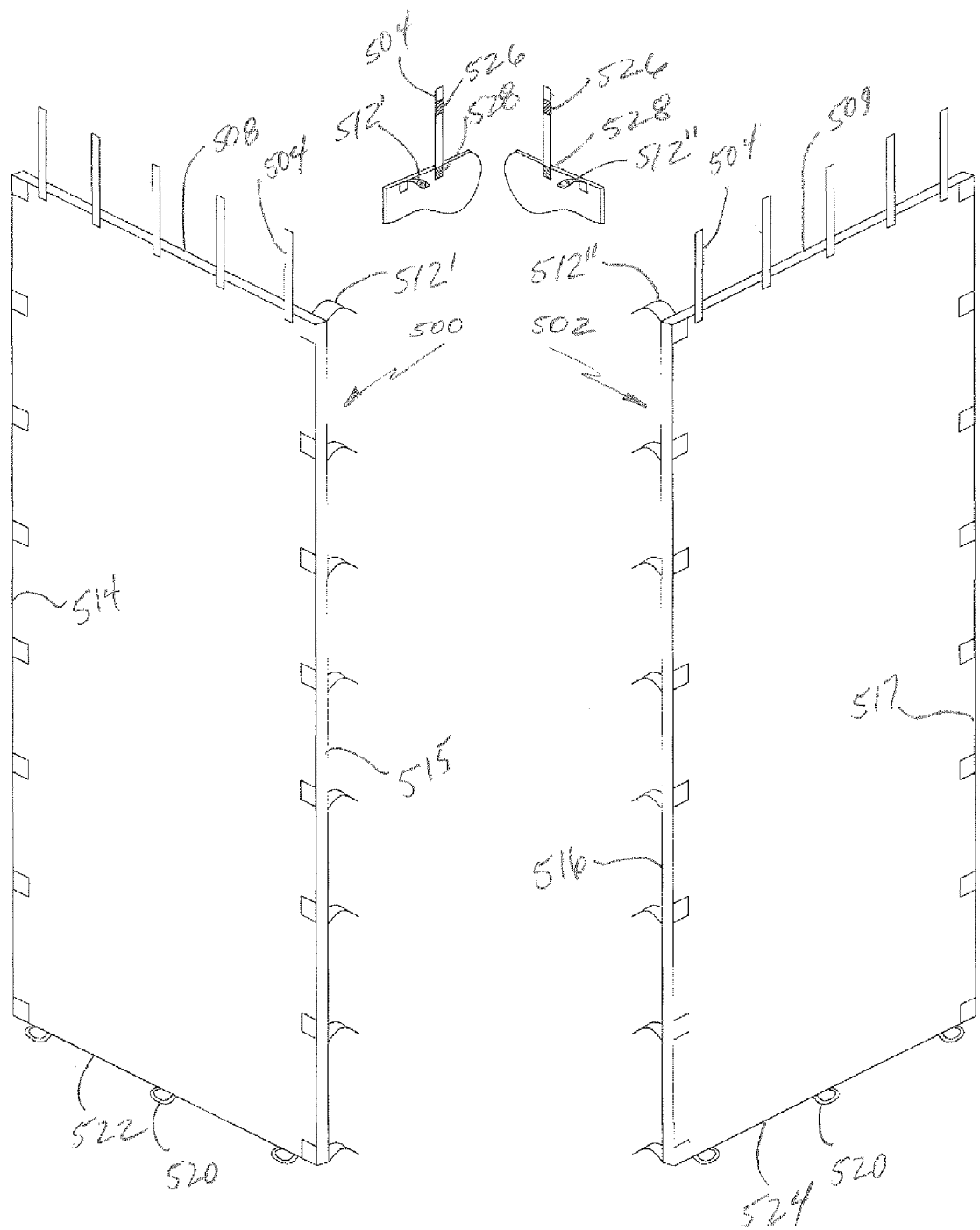
FIG. 13 is a front side perspective view of a pair of fabric panels in accordance with the principles of the present invention.

FIG. 13 illustrates two fabric panels 500 and 502 in accordance with the principles of the present invention. The fabric panels 500 and 502 are both similar configured with a plurality of attachment features evenly spaced around the perimeter of each panel 500 and 502. Relatively longer straps 504 are fixedly attached positioned to and along the top edge 508 and 509 of each panel 500 and 502, respectively. The longer straps 504 are configured to fit over the cross-member of the frame. Smaller straps 512' and 512" are fixedly attached to and along the vertical sides 514, 515, 516 and 517 of the panels 508 and 509. The smaller straps 512' and 512" are configured to attach to one another, as with snaps or hook and loop fastener material so as to couple the adjacent sides 515 and 516 of the panels 500 and 502 together. Loops 520 or grommets are located along the bottom edge 522 and 524 of each fabric panel 500 and 502 to allow the user to stake the panels 500 and 502 to the ground. It is also contemplated that the strap 512 could be replaced by attaching loop tabs to the front of each panel along a left edge and hook tabs to the back of each panel along a right edge such that the panels can be attached to each other by slight overlapping of adjacent panels.

Each strap 504 is provided with a section of hook tape 526 attached to one end of the strap and a section of loop tape 528 attached to the other so that the strap 504 can form a loop to attach around a cross-member of the frame. The small straps 512' are provided with hook tape with the straps 512" provided with loop tape to attach to a corresponding small strap 512'.

In order to take down the blind of the present invention, the two halves of the blind are separated by disconnecting the fabric panels on the ends of the frame from each other. The fabric panels may then be removed from the frame or more conveniently, the fabric panels may remain attached to the frame. If the fabric panels remain attached to the frame, the panels are bunched together along the cross-member to allow the cross-members to be shortened. The process is then reversed from the set up procedure. Once the frame is lying on the ground in its smallest dimensions with the legs in a position perpendicular to the horizontal tube and the fasteners loosened, the fabric is laid on the ground beneath the frame. The fabric is folded so that it is not wider than the length of the cross-member.

The bracket that mounts the ends of the legs to the ends of the horizontal tube is rotated ninety degrees in either direction on the axis created at the point of attachment of the bracket and the cross-member. The legs are rotated at the points of attachment to the bracket until the ends of the legs are parallel to the cross-member. With the legs and cross-member parallel to each other, they are rolled on top of the fabric causing the fabric to wrap around the tubes and itself.

Once the frame and fabric are rolled up, they can be placed inside of a stuff sack for storage and/or transport. For additional convenience, when the user breaks down both halves so that the legs and horizontal tubes are parallel and the fabric stretched out on the ground, the tubes and fabric from one half can be placed on top of the other half and both halves rolled up together as shown in FIG. 7.

Figure 14:
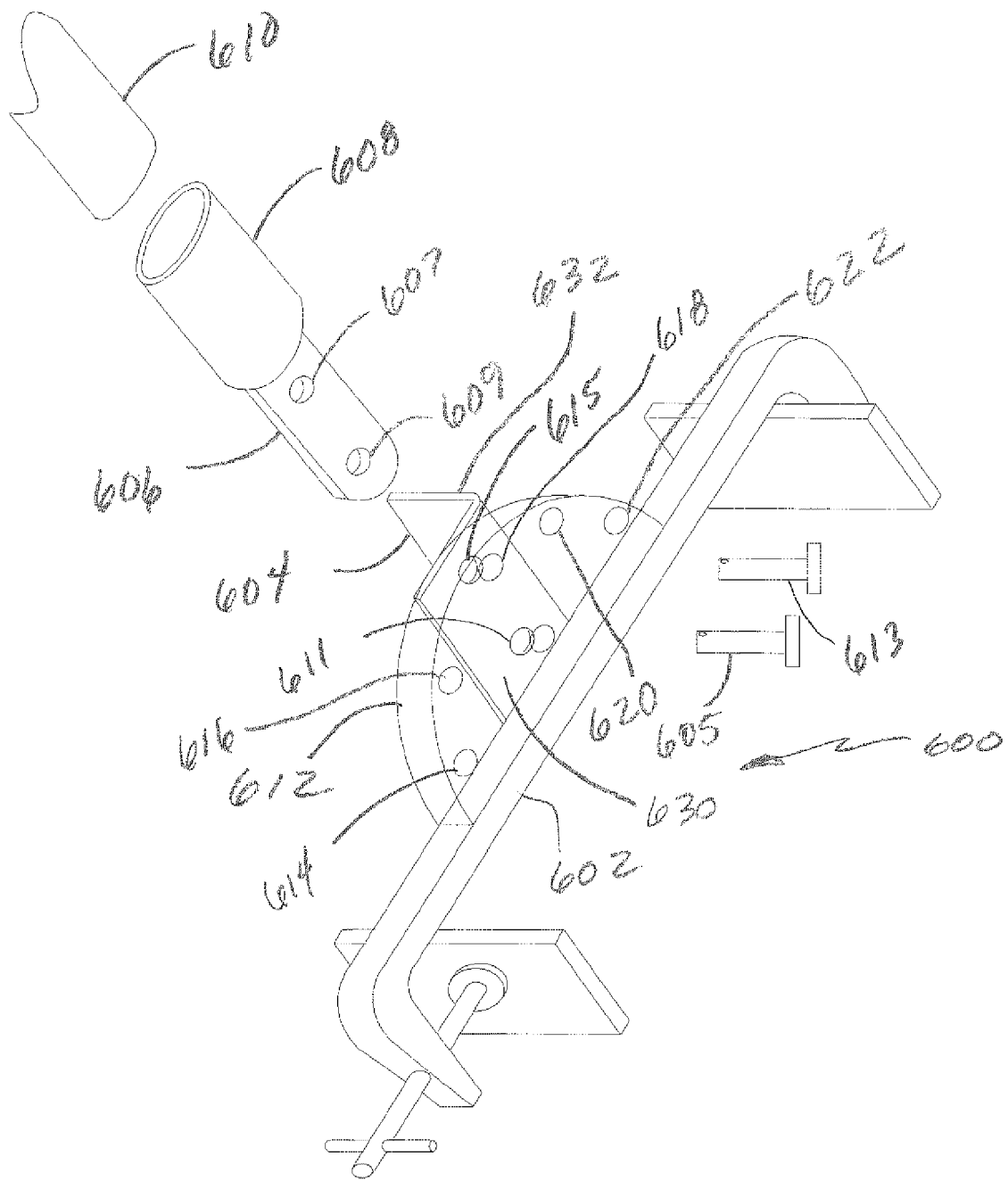
FIG. 14 is a side perspective view of a clamp in accordance with the principles of the present invention.

A blind according to the present invention can be attached to a boat or other structure with the attachment clamp 600 illustrated in FIG. 14. The blind, either in its full or half form, can be mounted to a boat or other structure using the clamp 600. At a location approximately in the middle of each clamp's spine 602, a leg attachment member 604 is coupled. The attachment member 604 is wider than the width of the spine 602 so that a hole may be drilled in the member 604 without affecting the clamp. A fastener, such as a bolt or pin 605, secures a tube end 606 similar to the ones located on the ends of the legs and cross-members previously described, but having a pair of holes 607 and 609. The tube end 606 is attached to a piece of tubing 608 which is approximately six inches in length and of a diameter such that the blinds leg 610 will slide into the tube 608. The pin 604 is positioned through the hole 609 and the hole 611 of the member 604 to allow the tubing 608 to pivot relative to the member 604. A second pin 613 may be inserted through hole 615 and hole 607 holds the end 606 in place relative to the member 604. The angle of the tube 608 can be adjusted by using a bolt/nut assembly for pin 605 and eliminating pin 613. By loosening the bolt/nut assembly securing tube 608 to the clamp 600, the tube 608 can be rotated to the desired location and tightening the bolt/nut assembly to hold it in the desired angular orientation.

For additional stability, a larger arc shaped attachment member 612 with holes 614, 616, 618, 620 and 622 drilled in an arc could be used to accept the pin 605 for pivotable adjustment with the pin 613 inserted through one of the holes 614, 616, 618, 620 or 622 to hold the end 606 at a particular angular orientation. The arc member 612 may be removably attached to either side 630 or 632 of the member 604 on either side of allow for positioning and pivoting of the tube 608 about an axis of rotation that is ninety degrees apart.

By providing and securing at least four such clamps 600 to the edge of a boat or other structure at locations where the outermost blind legs will be located, the outermost blind legs can be slid into the tubes of the clamps to support the bottom ends of the legs of the blind. The remaining legs can be placed inside of the boat or other structure to rest upon the support surface, such as the floor of the boat. Thus, two clamps are used for securing one half of the blind and four are used for securing both halves of the blind, with the remaining legs resting inside the boat or other structure. The camouflage fabric skin is used on the framework in this application in the same manner as previously described.

If desired, the blind may be collapsed for transportation while still mounted to the boat or other structure, such as the bed of a truck, by adjusting the legs to their shortest length, and rotating the innermost legs toward the outer legs. Then the clamp receiver tubes holding the outer legs are rotated toward the inside of the boat until the horizontal tube comes to rest inside of the structure, such that the blind is essentially lying flat.

In another embodiment of a clamp, the attachment portion includes a piece of angle iron 615 or square tubing of approximately the same length of the attachment. The angle iron 615 is welded to the clamp. Because this material has sides that are perpendicular to each other, when holes are drilled near the tops of each, the receiver tubes described above may be mounted in either hole, thus allowing the receiver tube to rotate on one axis when mounted in one hole, or to rotate on an axis perpendicular to the first axis when mounted in the other hole. This is advantageous to the user when it is necessary to attach the clamp to an object that requires the clamp to be in a position that would otherwise not allow the receiver tubes to rotate in the direction necessary to receive the legs of the blind.

Figure 15:
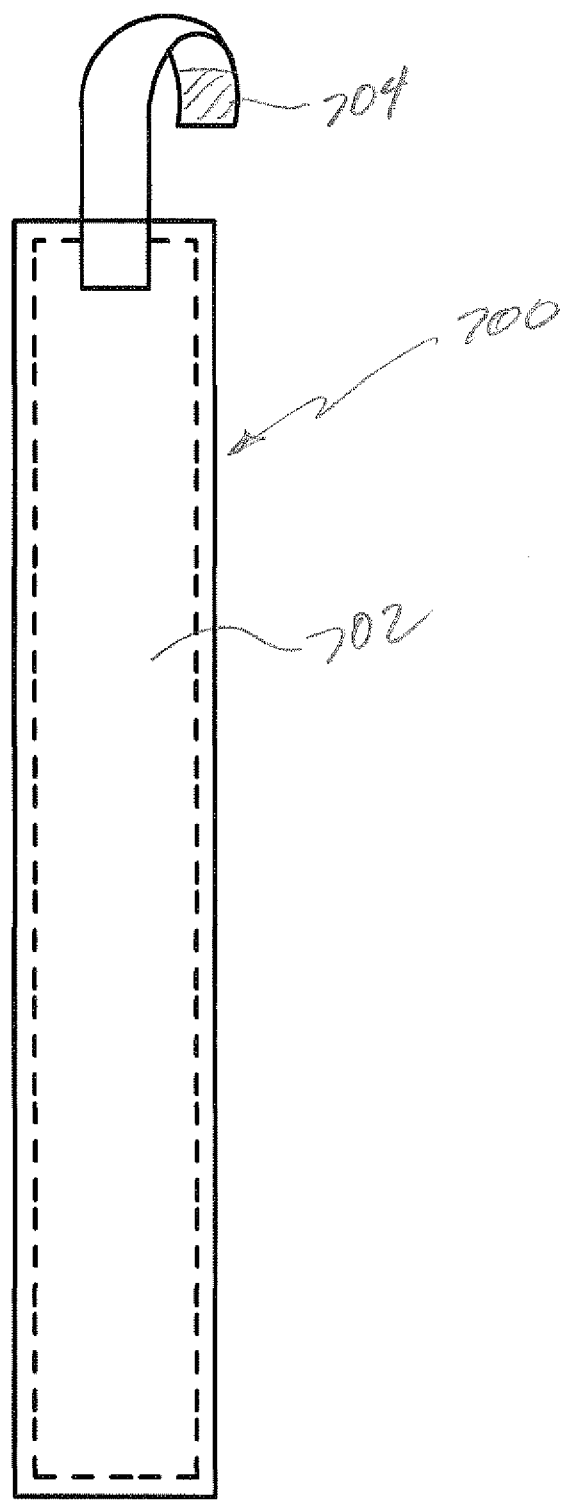
FIG. 15 is a front side view of a fabric strip in accordance with the principles of the present invention.

On occasion, the user may wish to be concealed from wildlife, but at the same time, make their presence within the blind known to other people, particularly other hunters, for safety. In such circumstances as shown in FIG. 15, the user may temporarily attach blaze orange colored fabric strips 700 to the cross-members of the blind so that the strips 700 are visible to other people. The strips 700 are comprised of an elongate orange fabric panel 702 to which a strip of material having hook tape 704 attached to an end and a section of loop tape attached to the back side of the panel 702 where the strip is attached. Snaps or other temporary attachment fasteners may also be used. This allows the strip 704 to be wrapped around a cross-member and hung there from.

The fabric strips may be used in other applications as well. For example, the user may use the fabric strip 702 with various hunting blinds, to mark a location, to mark a trail, to attach to the antlers of a game animal being taken from the field, to signal for help in an emergency, etc.

Figure 16A:
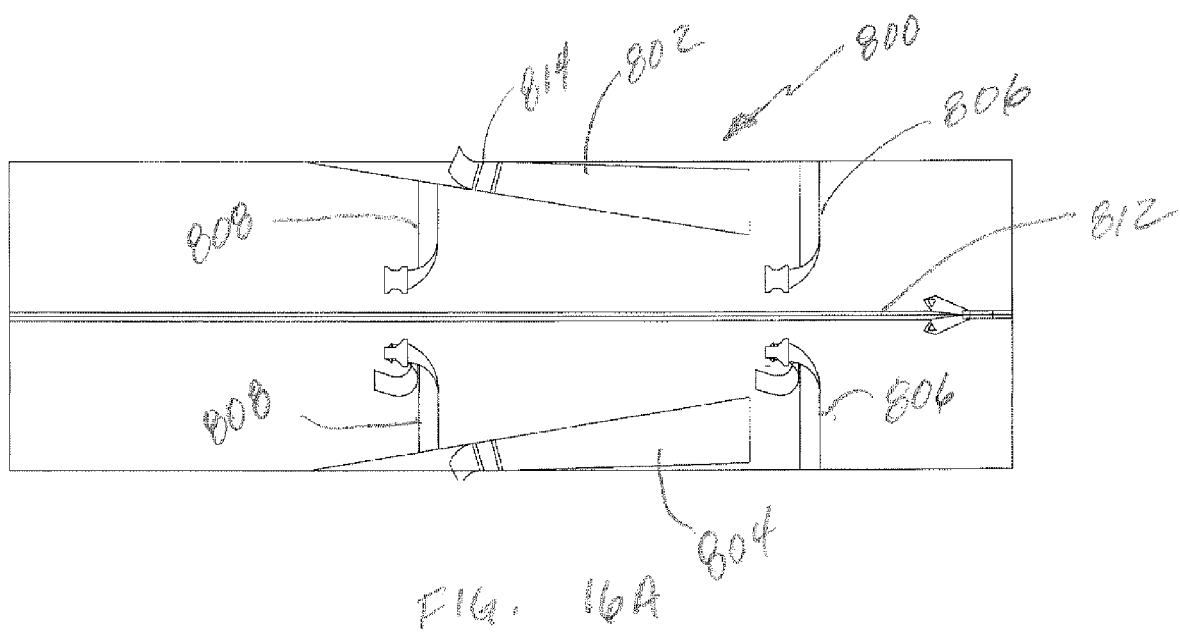
FIGS. 16A and 16B are front and back side views, respectively, of a backpack configured for storing a hunting blind in accordance with the principles of the present invention.
Figure 16B:
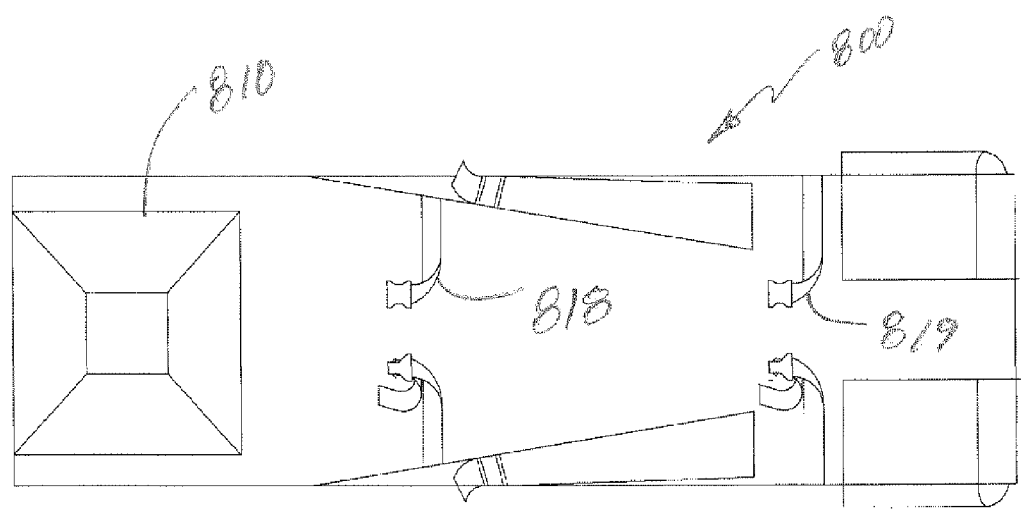

As shown in FIGS. 16A and 16B, after the hunting blind has been rolled up, a carrying bag 800 provides a means for storing and carrying the blind. The bag 800 provides shoulder straps 802 and 804 for carrying the bag, straps 806 and 808 for supporting and carrying a shotgun, rifle or bow and a plurality of cargo pockets 810 to transport additional items, such as ammunition, stakes, rope or other materials and supplies.

The bag 800 may be made of a heavy canvas or other durable material. The finished dimensions are approximately 60 inches long and 10 inches in diameter. A zipper 812 runs the length of the bag 800 along the center of the bag. The zipper side of the bag will be referred to as the "front" of the bag.

A pair of two inch wide shoulder straps 802 and 804 is secured on either side of the zipper 812. Each end of each strap 802 and 804 is permanently secured to the bag at points 18 inches from either end of the bag and approximately 5 inches from the zipper, so that the shoulder straps are ten inches apart from each other. Each shoulder strap has an adjuster mechanism 814 allowing the user to make the straps longer or shorter as desired. The total length of each shoulder strap is approximately 34 inches.

Located on the carrying bag's side opposite the zipper side, referred to as the back of the bag, are located a plurality of cargo pockets, such as cargo pocket 810. The pockets are located at the end of the bag closest to the ground when the user places the shoulder straps over each shoulder like a back pack. This end of the bag is referred to as the "bottom" of the bag. Each cargo pocket measures 6 inches long×6 inches wide×3 inches deep. Each cargo pocket contains a draw string within the top edge of the pocket allowing the cargo pocket's opening to be closed by the user. One cargo pocket is located at the mid-point of the bag on the back side of the bag approximately six inches from the bottom edge of the bag. Approximately three inches on either side of this cargo pocket are located two more cargo pockets, so that there are a total of three cargo pockets along the bottom of the bag, six inches from the bottom edge.

Directly above the two outermost cargo pockets, are located two more cargo pockets. These cargo pockets are located in such a way that their bottom edge is at least three inches away from the top most edge of the previously described cargo pockets.

Above the middle cargo pocket on the back side of the bag, at a distance of 34 inches, are located two, one-inch wide straps 818 and 819. Each strap is approximately five inches long. The ends of each strap are butted together at the bag's mid point, perpendicular to the length of the bag. A one inch section of each end of the straps is permanently secured to the bag. A buckle apparatus is secured to the opposite end of one of the straps that allows the end of the other strap to be threaded through the buckle, thus forming a loop that can be tightened or loosened by the user. The purpose of this loop is to secure a bow onto the bag.

At a location approximately 6 inches above the previously described strap is another one-inch strap forming a loop approximately 2 inches wide. Each end of this strap is permanently secured to the bug in such a way that a permanent loop is formed. The mid point of this loop is located approximately 2 inches to the left of the back of the bag's vertical mid point. Directly above this loop at a distance of approximately 6 inches, another loop identical to the first loop is located. The purpose of these loops is to secure a rifle or shotgun in a fashion described in detail in the below "application" section.

Placing the hunting blind carrying bag on the ground with the zipper side of the bag facing upward, the user, after rolling the blind material around the blind framework, may unzip the hunting blind carrying bag and place the hunting blind inside of the carrying bag. The carrying bag serves as a means to store the blind when not in use, as well as a means to transport the blind to and from the field. The carrying bag's unique design allows the user to transport a bow, or shotgun, or rifle, and other various items to and from the field, allowing the user's hands to remain free.

On occasion, such as in windy conditions, the user may wish to secure the blind framework to the ground. On other occasions, when the blind framework is being placed on a soft surface such as mud, the user may desire to reduce the extent to which the blind framework legs sink into said surface. Thus, a foot may be attached to the end of each leg that allows the foot to be staked to the ground with a stake. The stake may be attached to the foot so that the user can stop on the top of the foot to press the stake into the ground.

When the foot and stake is attached to the leg of the framework in the above manner, the stake secures the frame to the ground and the foot reduces the extent to which the framework sinks into a soft surface.

The embodiments of a hunting blind in accordance with the principles of the present invention are provided by way of example and not limitation. The configuration or components of this invention are not limited to the above-mentioned embodiments; any change, decoration or substitute without deviating from the concept and technology of this invention is an equivalent replacement, and is included within the protection range of this invention. Thus, while the methods and apparatus of the present invention have been described with reference to certain illustrated embodiments to show and describe what is believed to be the best mode of the invention, it is contemplated that upon review of the present invention, those of skill in the art will appreciate that various modifications and combinations may be made to the present embodiments without departing from the spirit and scope of the invention as recited in the claims. The claims provided herein are intended to cover such modifications and combinations and all equivalents thereof. Reference herein to specific details of the illustrated embodiments is by way of example and not by way of limitation.

What is claimed is:

1. A hunting blind, comprising:
a plurality of pairs of legs;
a first A-frame comprising a first side comprising a first pair of legs of the plurality of pairs of legs coupled to a first end of a first cross-member and a second side comprising a second pair of legs of the plurality of pairs of legs coupled to a second end of the first cross-member;
a second A-frame comprising a first side comprising a third pair of legs of the plurality of pairs of legs coupled to a first end of a second cross-member and a second side comprising a fourth pair of legs of the plurality of pairs of legs coupled to a second end of the second cross-member;
a plurality of coupling assemblies each coupling one pair of the plurality of pair of legs to one end of each of the first and second cross-members in a manner that allows each leg of the one pair of legs to be independently rotated at least 90 degrees relative to one another and in a manner that allows each cross-member of the first and second cross-members to be independently rotated at least 90 degrees relative to each pair of legs coupled thereto about an axis of rotation that is approximately 90 degrees from an axis of rotation of each pair of legs coupled thereto, each coupling assembly of the plurality of coupling assemblies comprising a mounting member having first and second sides that are substantially parallel to one another, a first leg attachment structure laterally extending from the first side of the mounting member and a second leg attachment structure laterally extending from the second side opposite the first leg attachment portion, each leg of the plurality of pairs of legs having an end rotatably attached to a corresponding one of the first and second leg attachment structures with the respective mounting member interposed between the rotatably attached ends of each leg, the first and second attachment structures each configured to selectively secure each leg of the pair of legs to the mounting member at any desired angle between the pair of legs between at least 0 degrees and 90 degrees;
a first fabric panel having a top edge coupled to the first cross-member and having a first side edge extending around a first side of the first A-frame and a second side edge extending around the second side of the first A-frame; and
a second fabric panel having a top edge coupled to the second cross-member and having a first side edge extending around a first side of the second A-frame and second side edge extending around a second side of the second A-frame, the first and second A-frames being spaced apart and the first edge of the first fabric panel removably coupled to the first edge of the second fabric panel and the second edge of the first fabric panel removably coupled to the second edge of the second fabric panel, the top edges of the first and second fabric panels defining an opening through which a hunter can view and shoot fowl.

2. The hunting blind of claim 1, wherein each leg of the plurality of pairs of legs are rotatably coupled to a respective first or second leg attachment structure to allow at least 180 degrees of independent rotation between each leg and the leg attachment structure.

3. The hunting blind of claim 1, wherein each leg of the plurality of pairs of legs are rotatably coupled to a respective first or second leg attachment structure to allow at least 360 degrees of independent rotation between each leg and the leg attachment structure.

4. The hunting blind of claim 1, wherein the first and second sides of the mounting member are spaced-apart to form an opening thereinbetween and the first and second leg attachment portions are substantially co-linear with each other.

5. The hunting blind of claim 4, wherein the first and second leg attachment structures comprise an elongate fastener coupled to and extending through the mounting member with at least one leg of the first, second, third and fourth pair of legs rotatably disposed on the elongate fastener and selectively substantially rigidly held relative to the mounting member with the elongate fastener alone.

6. The hunting blind of claim 5, wherein the elongate fastener extends through a pair of linearly aligned holes, each formed in one side of the first and second sides of the mounting member, and laterally extends from the sides of the mounting member.

7. The hunting blind of claim 6, further comprising a pair of spacers disposed on the elongate fastener and on opposite sides of the mounting member with a respective pair of legs disposed on the elongate fastener with each spacer disposed between a respective leg and the mounting member, and wherein the elongate fastener is hand tightenable by a user to substantially rigidly secure the respective pair of legs to the mounting member at a desired orientation.

8. The hunting blind of claim 7, wherein each leg of the plurality of pairs of legs can independently rotate relative to the mounting member 360 degrees.

9. The hunting blind of claim 4, further comprising a cross-member attachment structure fixedly attached to the mounting member at an orientation that is substantially perpendicular to the first and second leg attachment structures.

10. The hunting blind of claim 9, wherein the cross-member attachment structure comprises an elongate fastener coupled to and extending through the mounting member with one end of a respective cross-member rotatably disposed on the elongate fastener and selectively substantially rigidly held relative to the mounting member with the elongate fastener alone.

11. The hunting blind of claim 1, wherein the plurality of legs and the first and second cross members are telescopic to allow selective adjustment in length.

12. The hunting blind of claim 11, wherein the first pair of legs can be rotated at least 90 degrees in a first direction of rotation relative to the first cross-member to be substantially parallel to the cross-member and adjacent thereto and the second pair of legs can be rotated in a second opposite direction of rotation relative to the first cross-member to be substantially parallel to the cross-member, with the first pair of legs overlapping the second pair of legs.

13. The hunting blind of claim 12, wherein an overall length of the first cross-member and first and second pairs of legs when folded relative to the first cross-member so as to be substantially parallel thereto is approximately equal to a length of a longest telescopic section of one of the first and second pairs of legs and the cross-member.

14. The hunting blind of claim 13, wherein the first fabric panel is wrapped around the first and second pairs of legs and spans between the first cross-member, and wherein the second fabric panel is wrapped around the third and fourth pairs of legs and spans between the second cross-member, the first fabric panel and the second fabric panel forming a first vertical seam between the first pair of legs and the third pair of legs and a second vertical seam between the second pair of legs and the fourth pair of legs.

15. The hunting blind of claim 14, wherein the at first and second fabric panels include a first plurality of spaced-apart elongate straps attached at one end to the top edges of the first and second fabric panels for releasably coupling the top edges of the first and second fabric panels to the first and second cross-members, respectively.

16. The hunting blind of claim 15, further comprising a second plurality of spaced-apart elongate straps attached along the side edges of the first and second fabric panels configured for releasably coupling adjacent side edges of the first and second fabric panels.

17. The hunting blind of claim 16, wherein the second plurality of spaced-apart straps comprise a first set of straps along a first edge of the first fabric panel each having a first part of a temporary fastener and a second set of straps along a first edge of the second fabric panel each having a second part of a temporary fastener for attaching to the first part of a corresponding strap.

18. The hunting blind of claim 1, wherein each leg of each pair of the plurality of pairs of legs rotate about parallel axes of rotation.

19. The hunting blind of claim 1, further comprising a plurality of clamp devices, each configured for attaching to a distal end of each leg and for clamping to an existing structure to securely hold each leg to the existing structure.

20. The hunting blind of claim 19, wherein each of the plurality of clamp devices is rotatably coupled to the distal end of each leg and configured for releasably coupling the distal end of each leg at select angular positions relative to the clamp device.

\* \* \* \* \*